(12) United States Patent
Aschwanden et al.

(10) Patent No.: US 11,448,900 B2
(45) Date of Patent: Sep. 20, 2022

(54) TUNABLE NON-ROUND FLUIDIC LENS WITH IMMERSED LENS SHAPER

(71) Applicant: OPTOTUNE AG, Dietikon (CH)

(72) Inventors: Manuel Aschwanden, Allenwinden (CH); Roman Patscheider, Winterthur (CH); David Leuenberger, Zurich (CH); Michael Bueler, Vogelsang (CH)

(73) Assignee: OPTOTUNE AG, Dietikon (CH)

( * ) Notice: Subject to any disclaimer, the term of this patent is extended or adjusted under 35 U.S.C. 154(b) by 676 days.

(21) Appl. No.: 16/324,923

(22) PCT Filed: May 5, 2017

(86) PCT No.: PCT/EP2017/060845
§ 371 (c)(1),
(2) Date: Feb. 12, 2019

(87) PCT Pub. No.: WO2018/028847
PCT Pub. Date: Feb. 15, 2018

(65) Prior Publication Data
US 2021/0278703 A1    Sep. 9, 2021

(30) Foreign Application Priority Data
Aug. 12, 2016  (EP) ..................................... 16184123

(51) Int. Cl.
    *G02C 7/08*    (2006.01)
(52) U.S. Cl.
    CPC .................. *G02C 7/085* (2013.01)

(58) Field of Classification Search
    CPC ...... G02B 3/14; G02B 13/0075; G02B 15/00; G02B 15/20; G02B 15/142; G02C 7/08; G02C 7/085; A61F 2/145; A61F 2/1613; A61F 2/1635; H04N 5/2254; H01F 7/0226; H01F 7/1646; F03G 7/065
    See application file for complete search history.

(56) References Cited

U.S. PATENT DOCUMENTS

| 5,668,620 A | 9/1997 | Kurtin et al. |
| 6,040,947 A | 3/2000 | Kurtin et al. |
| (Continued) | | |

FOREIGN PATENT DOCUMENTS

| CN | 201352278 Y | 11/2009 |
| CN | 103329030 | 9/2013 |
| (Continued) | | |

*Primary Examiner* — Mustak Choudhury
(74) *Attorney, Agent, or Firm* — JMB Davis Ben-David

(57) ABSTRACT

The invention relates to an optical device (1), comprising: at least a first lens 100) having an adjustable focal length, wherein the first lens (100) comprises a container (2) that defines a volume (V) which is filled with a transparent fluid (F), and wherein the container (2) comprises a front wall (20), which front wall (20) comprises a transparent membrane (21) that is flexible and stretchable and a transparent lens shaper (22) that is immersed in the fluid (F) and connected to the membrane (21), so that the lens shaper (22) defines a curvature-adjustable area (23) of the membrane (21), and wherein the container (2) comprises a back wall (30) facing the front wall (20), wherein the fluid (F) is arranged between the front wall (20) and the back wall (30), and wherein the back wall (30) forms a lens.

16 Claims, 12 Drawing Sheets

(56) References Cited

U.S. PATENT DOCUMENTS

Figure 1:
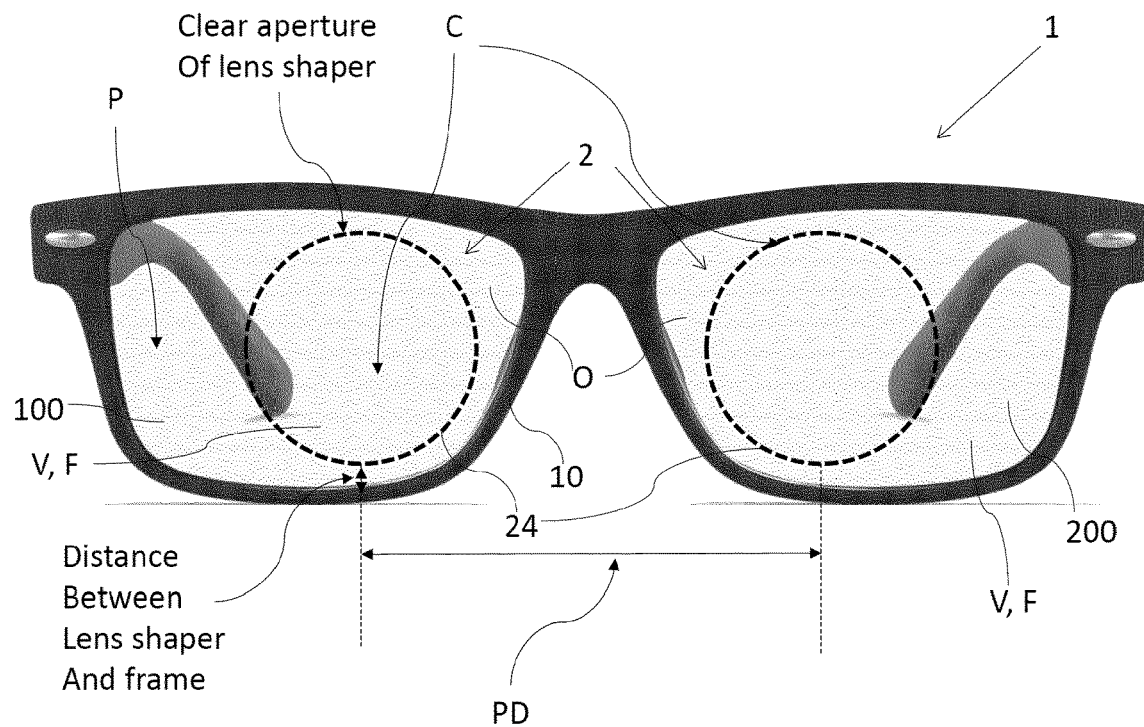

| | | | |
|---|---|---|---|
| 2004/0184158 A1 | 9/2004 | Shadduck | |
| 2007/0211207 A1 | 9/2007 | Lo et al. | |
| 2009/0251792 A1* | 10/2009 | Suzuki | G03B 17/56 359/666 |
| 2010/0202054 A1* | 8/2010 | Niederer | G02B 3/14 359/558 |
| 2012/0069450 A1 | 3/2012 | Bolis | |
| 2013/0229617 A1* | 9/2013 | Kurtin | G02B 3/14 351/159.41 |

FOREIGN PATENT DOCUMENTS

| | | |
|---|---|---|
| JP | 1986061137 | 4/1986 |
| JP | 200081503 | 3/2000 |
| JP | 2016510430 | 4/2016 |
| WO | 2015052236 | 4/2015 |
| WO | 2015/0184412 | 12/2015 |
| WO | 2015185673 | 12/2015 |

\* cited by examiner

TUNABLE NON-ROUND FLUIDIC LENS WITH IMMERSED LENS SHAPER

CROSS-REFERENCE TO RELATED APPLICATIONS

This is the U.S. National Stage of International Application No. PCT/EP2017/060845 filed on May 5, 2017, which was published in English under PCT Article 21(2), which in turn claims priority to European Patent Application No. 16184123.4 filed on Aug. 12, 2016.

The present invention relates to an optical device, particularly in the form of a lens, particularly for a spectacle. Further, particularly, the invention relates to spectacles comprising such lenses.

More particularly, such a lens is at least in part fluid- or liquid-filled and has an adjustable focal length.

More particularly, the present invention relates to designs and methods of how to use and control such dynamic lenses.

The present invention is not only applicable to spectacle lenses but also to other lenses that may be used in a variety of different applications such as but not limited to diopter control in viewfinders, virtual reality (VR) and augmented reality (AR) systems, particularly spectacles for VR or AR.

Myopia (nearsightedness) refers to the condition of defect vision of distant objects. Hyperopia (farsightedness) refers to the condition of defect vision of near objects. Both Myopia and Hyperopia are related to the refractive power of eye with respect to the size of the eyeball and are constant over the life.

Prespiopia (farsightedness) is a condition caused by loss of elasticity of the lens of the eye. It reduces the ability of the human eye to accommodate, i.e. to alter the focal length of the natural eye. It is occurring typically in middle and old age.

Accommodation in human beings is reduced to 3 D (diopters) or less at an age range of 35-45 years. At that point, reading glasses or some other form of near vision correction becomes necessary for the human eye to be able to focus on near objects.

Having to switch between spectacles with different optical power can be prevented by using either bifocal, multifocal or progressive spectacle lenses or contact lenses. In case of progressive lenses, a "corridor" of optimum lens power runs vertically down each progressive lens. In contrast to bifocals and trifocals a smooth change of focus from distance to near occurs without image jump.

A large segment of the population requires a different visual correction for each eye. These people, known as anisometropes, require different visual correction for each eye for maximum visual comfort.

Adjustable optical lens systems comprising fluids are ideally suited for spectacles because of their compact size, low weight, and continuous adjustment of optical power. In case of an electrically controlled lens the fast switching speed and the low electrical power are key benefits.

Adjustable optical lens systems comprising fluids are known from the prior art.

WO07049058 is directed to a lens with a variable focus, which comprises a rigid ring to which a flexible membrane is attached. A rigid transparent front cover is attached to the flexible membrane and a rigid rear cover on the rear surface of the ring. A cavity is formed between the flexible membrane and the rear cover which is filled with a liquid. The amount of liquid in the cavity can be adjusted to vary the curvature of the flexible membrane and so vary the optical characteristics of the lens. A second flexible membrane can be positioned between the rear cover and the ring.

Further, WO06011937 is directed to a fluidic adaptive lens device with at least one flexible membrane (indicated as first partition). The adaptive lens includes a first flexible and optically transparent membrane. A second partition, which is coupled to the flexible membrane, is at least partially optically transparent. A first cavity is formed in between the flexible membrane and the second partition. The lens device comprises a fluid within the cavity. Furthermore the device comprises means, e.g. a Teflon coated screw, to control the pressure or the volume of the fluid in the chamber. When the parameter of the fluidic medium changes, the membrane flexes and the optical property of the lens changes.

Further, US2003095336 describes a lens arrangement mainly for a corrective or a prescription lens. The prescription lens is adjacent to a fluid cell which has a flexible membrane and a base. In that fluid is pumped into or out of the fluid cell the corrective power of the entire lens arrangement is varied.

Furthermore, fluid lenses have also been proposed for ophthalmic applications (see, e.g. U.S. Pat. No. 7,085,065).

Furthermore, fluid lenses designed for the purpose of tunable spectacles are described in the subsequent paragraphs.

U.S. Pat. No. 8,414,121 B2 describes non-round tunable fluid lens assembly where the thickness of the membrane includes thickness contours to partially cancel out asphericity (especially astigmatism) at a particular stage of inflation of the membrane. In consequence a complicated fitting and optimization procedure is required for each specific shape of spectacle frame.

Further, US 2012/0087014 describes a liquid actuation mechanism integrated into the brackets of the spectacles. Fluid is pumped from the reservoir inside the bracket into the optical aperture via a flexible tubing.

Furthermore, US 2012/0287512 A1 describes different actuator mechanism for an adjustable fluid-filled lens, including magnetic, mechanical and thermal, all integrated into the bracket of the spectacles. In some embodiments, an adjustable fluid-filled lens includes a septum configured to be pierceable by a needle and automatically and fluidly seal a chamber after withdrawal of the needle.

Furthermore, US 2012/0087015 A1 describes an embodiment of a piezo-electrically controlled fluid reservoir which is integrated into the perimeter of the lens module.

Based on the above, the problem underlying the present invention is to provide a versatile optical device for vision correction.

This problem is solved by an optical device having the features of claim 1.

Preferred embodiments of the optical device are stated in the corresponding sub claims and are described below.

According to claim 1, an optical device is disclosed, comprising:
- at least a first lens having an adjustable focal length,
- wherein the first lens comprises a container that defines a volume which is filled with a transparent fluid, and
- wherein the container comprises a front wall, which front wall comprises a transparent membrane that is flexible and stretchable and a transparent lens shaper that is immersed in the fluid (or contacts the fluid) and connected to the membrane, so that the lens shaper defines a curvature-adjustable area of the membrane, and
- wherein the container comprises a back wall facing the front wall, wherein the fluid is arranged between the front wall and the back wall, wherein the back wall forms a lens (e.g. providing additional refractive power).

Particularly, in all embodiments, the transparent fluid can be a transparent liquid (and vice versa).

Due to the fact, that the membrane can be elastically deformed for adjusting the curvature of said area, said container and the fluid residing therein form a focus adjustable (or tunable) lens.

Particularly, the fact that the lens shaper contacts the membrane can mean that the lens shaper contacts the membrane directly or indirectly via another material layer (e.g. formed by a glue etc.). The lens shaper can further be attached to the membrane by bonding it directly to the membrane or via another material layer such as a glue layer.

Particularly, the notion according to which the lens shaper defines an area of the membrane that has an adjustable curvature may mean that the lens shaper delimits, by being attached to the membrane or by contacting the latter, an elastically expandable (e.g. circular) area of the membrane, wherein particularly said area extends up to an (e.g. circumferential) inner edge of the opening formed in the lens shaper.

When the pressure of the fluid residing in the container increases due to an adjustment of the volume or due to fluid being pumped in or out of the volume of the container the curvature-adjustable area of the membrane expands and its curvature increases. Likewise, when the fluid pushes less against the membrane, the pressure of the fluid decreases causing the membrane to contract and said curvature of said area of the membrane to decrease. Increasing curvature thereby means that said area of the membrane may develop a more pronounced convex bulge, or that said area of the membrane changes from a flat state to a convex one. Likewise, a decreasing curvature means that said area of the membrane changes from a pronounced convex state to a less pronounced convex state or even to a flat state.

Generally, the membrane can be made of at least one of the following materials: a glass, a polymer, an elastomer, a plastic or any other transparent and stretchable or flexible material. For example, the membrane may be made out of a silicone-based polymer such as poly(dimethylsiloxane) also known as PDMS or a polyester material such as PET or a biaxially-oriented polyethylene terephtalate (e.g. "Mylar").

Further, the membrane can comprise a coating. Further, the membrane can also be structured, e.g. comprises a structured surface or have a variable thickness or stiffness across the membrane.

Further, said fluid residing in the container preferably is or comprises a liquid metal, a gel, a liquid, a gas, or any transparent, absorbing or reflecting material which can be deformed. For example, the fluid may be a silicone oil (e.g. Bis-Phenylpropyl Dimethicone). Additionally, the fluid may include fluorinated polymers such as perfluorinated polyether (PFPE) inert fluid.

According to a preferred embodiment of the present invention, the lens shaper comprises a circular opening which is covered by the membrane, wherein said curvature-adjustable area is a region of the membrane that covers said opening (e.g. in a congruent fashion).

Further, according to a preferred embodiment of the invention, the lens shaper comprises a circumferential outer edge that is congruent to an outer contour of the back lens Further, according to a preferred embodiment of the invention, the material of the lens shaper, of the membrane, and the fluid each comprise a refractive index, wherein the absolute value of the difference of any two refractive indices of these three refractive indices is smaller than 0.1, preferably smaller than 0.02.

Further, according to a preferred embodiment of the invention, the container forms a semi-finished lens-blank having a circumferential boundary region that is configured to be at least one of: formed, shaped, machined, cut, sanded, milled, in order to be fitted to a contour of a frame, particularly a spectacle frame, for holding the container.

Furthermore, according to a preferred embodiment of the invention, the optical device comprises a front lens arranged in front of the membrane for protecting the membrane and e.g. for providing a base refractive power.

Furthermore, according to a preferred embodiment of the invention, the container comprises a spacer ring arranged between the lens shaper and the back lens.

Furthermore, according to a preferred embodiment of the invention, the spacer ring forms a sealing ring for the container.

Furthermore, according to a preferred embodiment of the invention, the spacer ring is elastically compressible. Particularly, the spacer ring may form a hinge on one side when an actuator acts on an opposing section of the ring to adjust the volume of the lens container Furthermore, according to a preferred embodiment of the invention, the optical device comprises an actuator means which is configured to adjust said volume of the first lens in order to adjust the curvature of said curvature-adjustable area and therewith the focal power of the first lens.

Further, according to an embodiment of the present invention, adjusting said volume comprises compressing a portion of the volume so that the fluid contained in the volume presses against the membrane so that the membrane bulges further outwards and thereby adjusts (particularly increases) the curvature of said curvature-adjustable area of the membrane, and/or wherein adjusting said volume comprises expanding a portion of the volume so that the fluid presses less against the curvature-adjustable area of the membrane and thereby adjusts (particularly decreases) the curvature of said curvature-adjustable area.

Particularly, said actuator means comprises at least one or several piezo elements for adjusting said volume.

Further, particularly, the at least one piezo element is arranged between the back wall and the lens shaper so as to move the back wall towards the lens shaper or away from the lens shaper, wherein particularly the lens shaper is arranged between the back wall and a first non-compressible spacer ring, and wherein particularly a second spacer ring that undergoes a thermal expansion, particularly in a direction normal to the front and back wall, and serves for compensation of a thermal expansion of the fluid, is arranged between the lens shaper and the first spacer ring. By means of the thermal expansion of the second spacer ring, a thermal expansion of the fluid can be compensated which helps to maintain the pressure in the volume constant over temperature and thus ensures a more stable focal power of the first lens over a broader range of temperatures.

Furthermore, according to an alternative embodiment of the invention, the optical device comprises an actuator means which is configured to pump fluid from a reservoir into and/or out of the volume into said reservoir to adjust said curvature-adjustable area and therewith the focal power of the first lens.

Furthermore, according to a preferred embodiment of the invention, the container comprises a pierceable seal for providing a fluid connection to said volume (i.e. so that fluid can be exchanged between the reservoir and said volume of the first lens.

Furthermore, according to a preferred embodiment of the invention, the actuator means comprises a conduit (e.g. in the form of a needle) that is configured to pierce said seal to provide a fluid connection between an external reservoir for the fluid and said volume of the first lens Furthermore, according to a preferred embodiment of the invention, the actuator means comprises a first adjustment means for transferring fluid out of the reservoir into said volume and vice versa, wherein particularly said first adjustment means comprises a slider.

Furthermore, according to a preferred embodiment of the invention, the actuator means comprises a separate second adjustment means (e.g. comprising screw) acting on the reservoir for adjusting the amount of fluid in the volume, namely independently from said first adjustment means. This allows one to set a base correction of the first lens. The other first adjustment means can then be used to change the focal power based on the base correction.

Furthermore, according to an embodiment, the actuator means comprises at least one electropermanent magnet and at least one magnetic flux guiding counter member attractable by the electropermanent magnet for adjusting said volume of the first lens in order to adjust the curvature of said curvature-adjustable area of the membrane.

Further, according to an embodiment of the present invention, the at least one electropermanent magnet is configured to generate an external magnetic field for attracting said at least one counter member for adjusting (particularly increasing) the curvature of said curvature-adjustable area of the membrane. Particularly, said external magnetic field can be turned on or off by applying a corresponding electrical current pulse to a coil of the electropermanent magnet, which coil encloses a (e.g. second) magnet of the electropermanent magnet, whose magnetization can be switched by a magnetic field generated by the coil upon applying said current pulse to the coil.

Further, according to an embodiment of the present invention, the at least one electropermanent magnet comprises a first magnet having a first coercivity (e.g. a "hard" magnetic material) and a first magnetization, and wherein the electropermanent magnet further comprises a second magnet having a second coercivity (e.g. a "soft" or "semi hard" magnetic material) and a second magnetization, wherein the first coercivity is larger than the second coercivity, and wherein the electropermanent magnet further comprises a coil encompassing the second magnet such that by applying a corresponding current to the coil the second magnetization can be switched from a parallel state where the two magnetizations are parallel to an antiparallel state where the two magnetizations are antiparallel (and vice versa), wherein when the second magnetization is in the parallel state the electropermanent magnet generates said external magnetic field, and wherein when the second magnetization is in the antiparallel state said external magnetic field vanishes.

In other words, in case the magnetically hard and soft materials (first and second magnet) have opposing magnetizations the magnet produces no net external field across its poles, while when their direction of magnetization is aligned, the electropermanent magnet produces an external magnetic field, which attracts the respective counter member.

Further, according to an embodiment, the at least one electropermanent magnet comprises two pole members, particularly consisting of a soft magnetic material, namely a first pole member arranged at a first end of the first magnet and at a first end of the second magnet, and a second pole member arranged at a second end of the first magnet and at a second end of the second magnet.

Because the pole members have a higher permeability than air, they concentrate the magnetic flux of the magnets. Particularly, when the magnetizations are antiparallel, the magnetic flux is short-circuited at the ends of the magnets via the respective pole member. In case the magnetizations are parallel, the magnetic flux is guided from one pole member to the associated counter member and back to the other pole member.

Further, according to an embodiment, the at least one electropermanent magnet is arranged on the back wall and the at least one associated counter member is arranged on the lens shaper. Particularly, it is also possible that the at least one electropermanent magnet is arranged on the lens shaper while the at least one associated counter member is arranged on the back wall.

Particularly, the at least one counter member faces its associated at least one electropermanent magnet such that the at least one counter member is pulled towards the at least one electropermanent magnet when the at least one electropermanent magnet generates said external magnetic field, whereby the lens shaper is pulled towards the back wall which compresses a portion of the volume so that fluid contained in the volume presses against the membrane (so that e.g. the membrane bulges further outwards) and thereby adjusts (particularly increases) the curvature of said curvature-adjustable area of the membrane.

Particularly, when the external magnetic field is turned off, the membrane, particularly said curvature-adjustable area returns into its initial position due to elasticity of the stretchable membrane, particularly of said curvature-adjustable area, which provides a restoring force.

Further, according to an embodiment, the optical device comprises a plurality of electropermanent magnets as well as a plurality of magnetic flux guiding counter members, wherein each electropermanent magnet faces an associated counter member.

Particularly, according to an embodiment, the electropermanent magnets are arranged on the back wall and the counter members are arranged on the lens shaper. Alternatively, it is also possible that the electropermanent magnets are arranged on the lens shaper and that the counter members are arranged on the back wall.

Particularly, the electropermanent magnets are arranged on the back wall along an (e,g. circumferential) boundary region of the back wall. Particularly, each electropermanent magnet faces an associated counter member arranged on the lens shaper. Again, particularly, the position of the respective electropermanent magnet and the respectively associated counter member can be interchanged.

Further, said container is held by a frame, wherein the at least one electropermanent magnet is arranged on the frame and the associated counter member is arranged on the lens shaper at an edge of the lens shaper.

Particularly, the at least one counter member is arranged offset with respect to the at least one electropermanent magnet, wherein, when the at least one electropermanent magnet generates said external magnetic field, the at least one associated counter member is pulled alongside the at least one electropermanent magnet so that particularly the lens shaper is pulled towards the back wall which compresses a portion of the volume so that fluid contained in the volume presses against the membrane (e.g. so that the membrane bulges further outwards) and thereby adjusts (particularly increases) the curvature of said curvature-adjustable area of the membrane.

Particularly, also here, when the external magnetic field is turned off, the membrane, particularly said curvature-adjustable area returns into its initial position due to elasticity of the stretchable membrane, particularly of said curvature-adjustable area, which provides a restoring force.

Also here, the device may comprise a plurality of electropermanent magnets. Particularly, these electropermanent magnets may then be are arranged on the frame along an (e,g. circumferential) edge of the lens shaper, Particularly, each electropermanent magnet is arranged offset with respect to an associated counter member arranged on the lens shaper (e.g. at the edge of the lens shaper).

Particularly, the respective counter member is arranged offset with respect to the associated electropermanent magnet, wherein, when the respective electropermanent magnet generates said external magnetic field, the associated counter member is pulled alongside the respective electropermanent magnet so that particularly the lens shaper is pulled towards the back wall which compresses a portion of the volume so that fluid contained in the volume presses against the membrane (e.g. so that the membrane bulges further outwards) and thereby adjusts (particularly increases) the curvature of said curvature-adjustable area of the membrane.

Again, particularly, the position of the respective electropermanent magnet and the respectively associated counter member can be interchanged.

According to yet another embodiment, the lens shaper is connected to the back wall via a hinge so that the lens shaper can be pivoted with respect to the back wall, particularly when the at least one electropermanent magnet attracts the associated counter member.

Particularly, according to an embodiment, the hinge is arranged on a side of the lens shaper opposite the at least one electropermanent magnet.

Furthermore, according to an embodiment, the lens shaper is connected to the back wall via a circumferential flexible seal member. Particularly, the at least one electropermanent magnet and/or the at least one counter member are arranged further outwards than the seal member. Particularly outside said volume that is laterally delimited by said seal member.

Further, according to yet another embodiment of the present invention, the volume comprises at least one reservoir connected to a main cavity of the volume by a channel.

According to an embodiment, the at least one reservoir is formed as a recess formed into the lens shaper and/or into the back wall. Further, particularly, the channel may be formed as a recess (e.g. groove), too, which recess or groove may be formed into the lens shaper and/or into the back wall.

Furthermore, according to an embodiment, the at least one reservoir is arranged between the at least one electropermanent magnet and the at least one associated counter member, so that when the electropermanent magnet attracts the associated counter member the reservoir is compressed and fluid contained in the reservoir is pushed into the main cavity and presses against the membrane (e.g. so that the membrane bulges further outwards) and thereby adjusts (particularly increases) the curvature of said curvature-adjustable area of the membrane.

Particularly, the membrane may forms a wall section of the at least one reservoir, wherein the at least one counter member is arranged on or in said wall section. Thus, also here, when the external magnetic field of the at least one electropermanent magnet is turned off, the wall section returns into its initial position and a corresponding amount of fluid returns into the reservoir thereby changing (particularly decreasing) the curvature of said curvature-adjustable area of the membrane.

Particularly, according to an embodiment, the optical device comprises a plurality of reservoirs, wherein each reservoir is connected to the main cavity via a channel. Particularly, each reservoir is arranged between an electropermanent magnet and an associated counter member, so that when the respective electropermanent magnet attracts the associated counter member, the respective reservoir is compressed and fluid contained in the respective reservoir is pushed into the main cavity and presses against the membrane (e.g. so that the membrane bulges further outwards) and thereby adjusts (particularly increases) the curvature of said curvature-adjustable area. Thus, using several reservoirs, the focal power of the optical device can be tuned in increments.

Furthermore, according to a preferred embodiment of the invention, the optical device comprises a second lens having an adjustable focal length. The second lens can be configured as the first lens (particularly as claimed in the claims and described herein) and then functions in the same way as the first lens. Particularly, the second lens may also comprise an actuator means as described herein.

Furthermore, according to a preferred embodiment of the invention, the optical device is formed as a pair of spectacles, particularly for correcting vision, particularly human vision. Further, the optical device may also be formed as spectacles or a headset for virtual reality or augmented reality.

Particularly, the first and/or the second lens may be held by a frame of the optical device that can be worn by a user such that the respective lens is arranged in front of an associated eye of the user. The first and the second lens may also form a connected lens.

Furthermore, according to the embodiment, the optical device is configured to adjust a focal length of the first lens and a focal length of the second lens simultaneously, particularly once a base correction has been set for each lens e.g. using the second adjustment means.

Further features, advantages and embodiments of the present invention will be described below with reference to the Figures, wherein FIG. 1 shows how a lens shaper with circular aperture can be fitted into a non-round arbitrary shaped spectacle glass.

Figure 2:
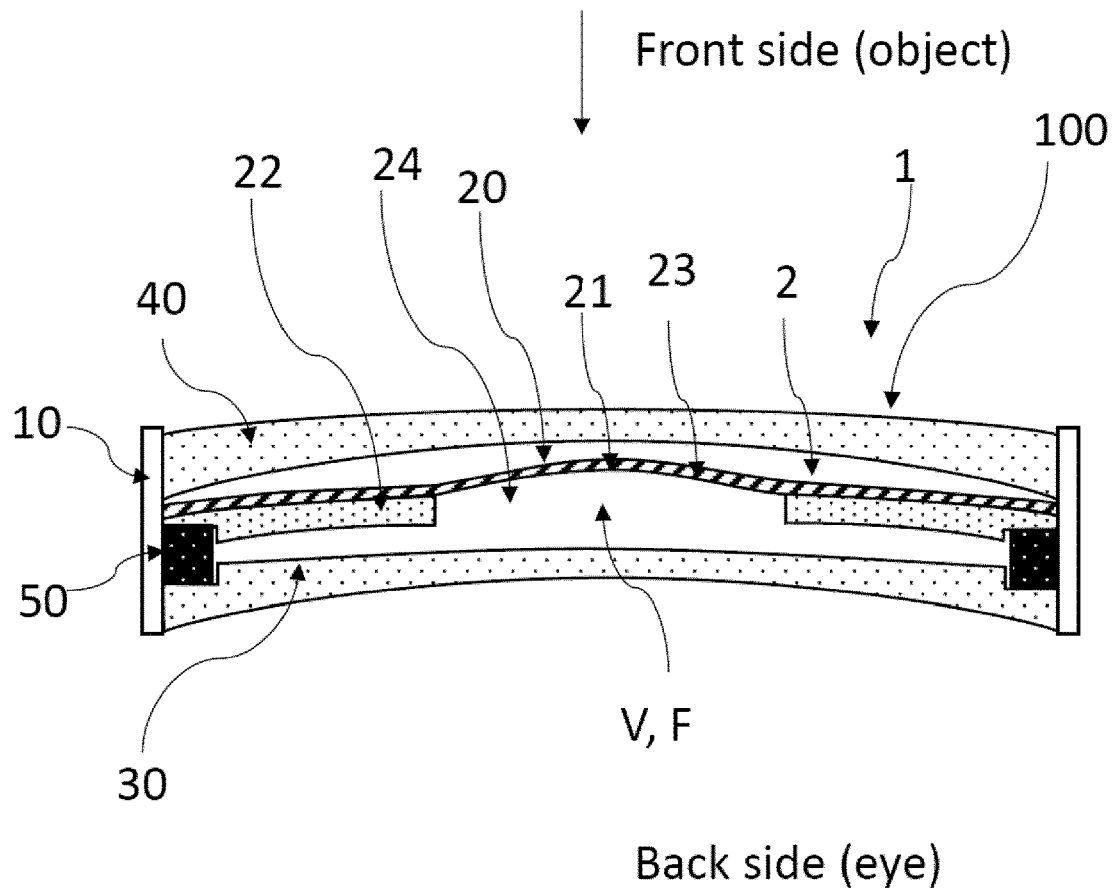

FIG. 2 shows the cross-section of a tunable lens based on an immersed lens shaper. A liquid-filled lens core (also denoted container herein) is formed between membrane, circular lens shaper, a spacer, and a back wall. No actuator is shown in this illustration.

Figure 3:
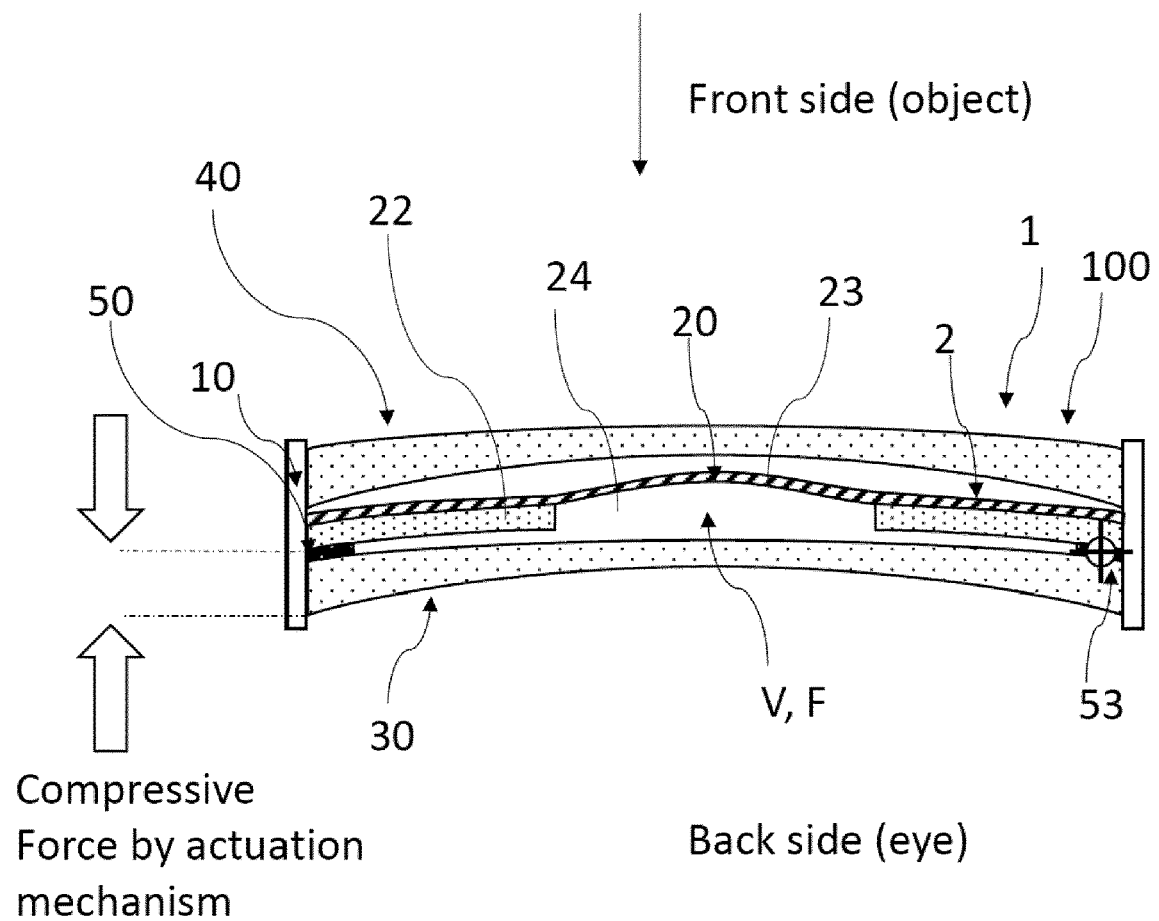

FIG. 3 shows the cross-section of a tunable lens based on an immersed lens shaper. A liquid-filled lens core is formed between membrane, circular lens shaper and a spacer. The spacer is a compressible elastomer. This spacer can act on one side as a mechanical hinge while on the opposite side it is compressed and expanded by an actuator.

Figure 4:
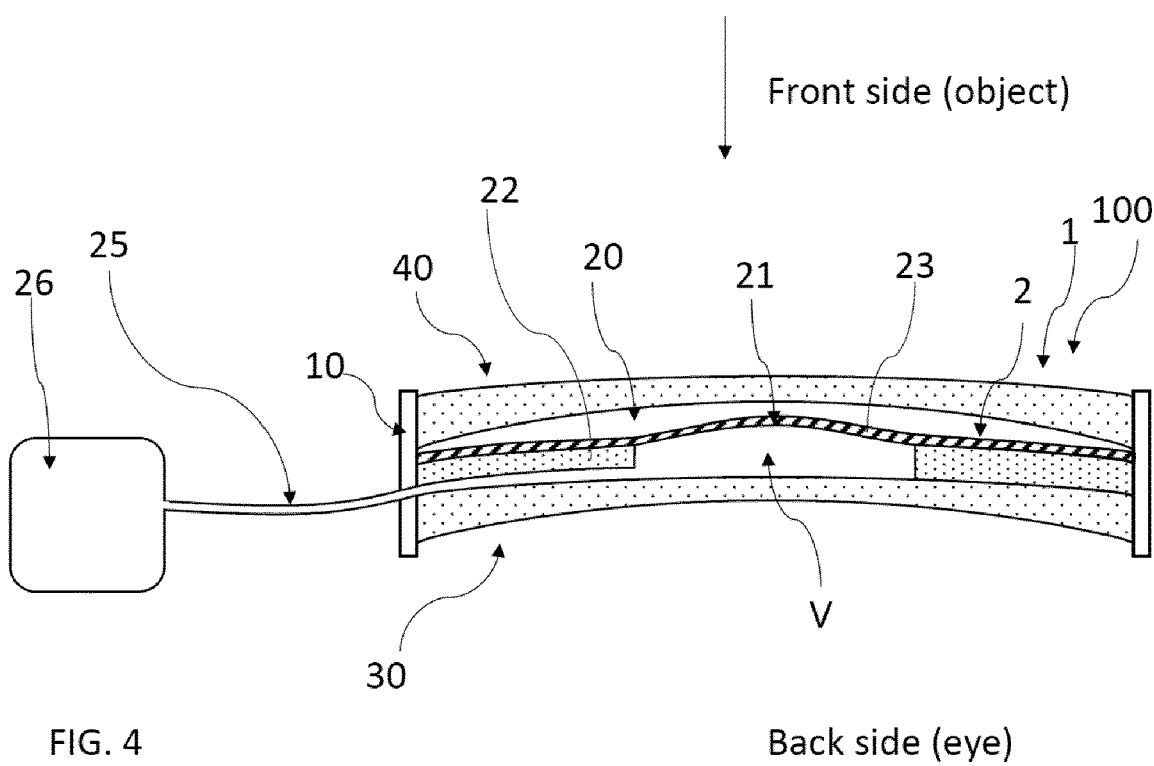

FIG. 4 shows the cross-section of a tunable lens based on an immersed lens shaper. A liquid-filled lens core is formed between membrane, circular lens shaper and a spacer. The shape of the membrane is being tuned by pumping liquid from a reservoir into the fluid cavity via a liquid transfer tube.

Figure 5:
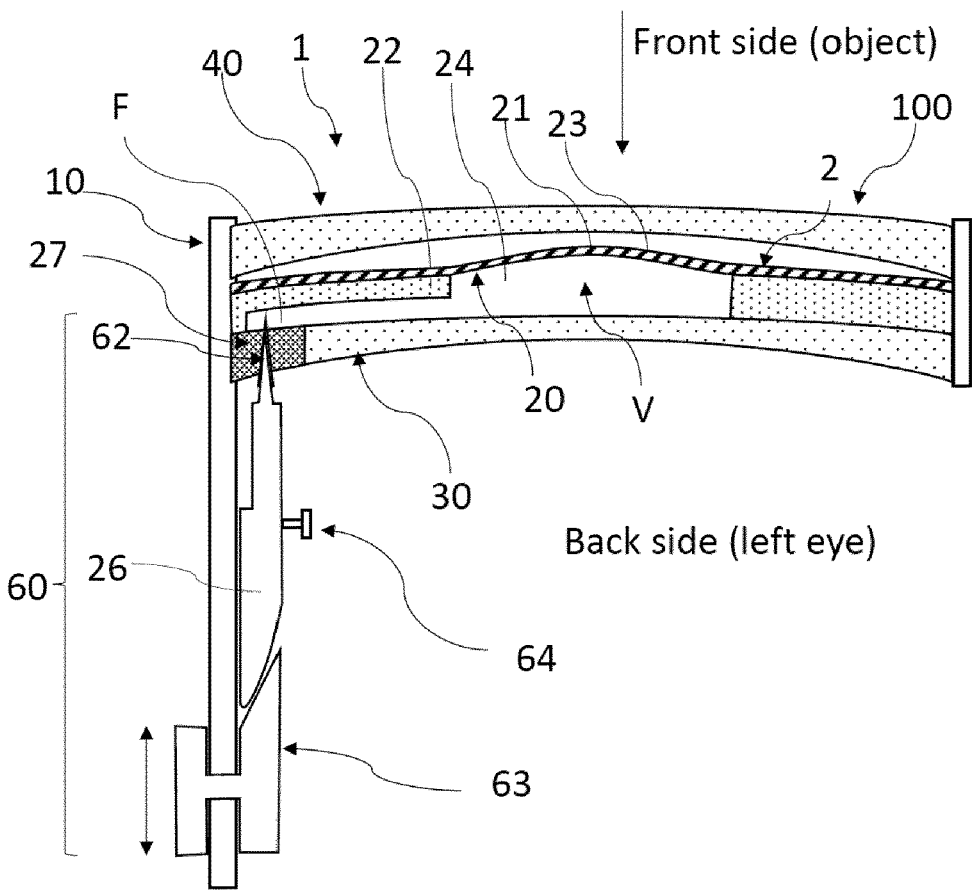
Figure 5:
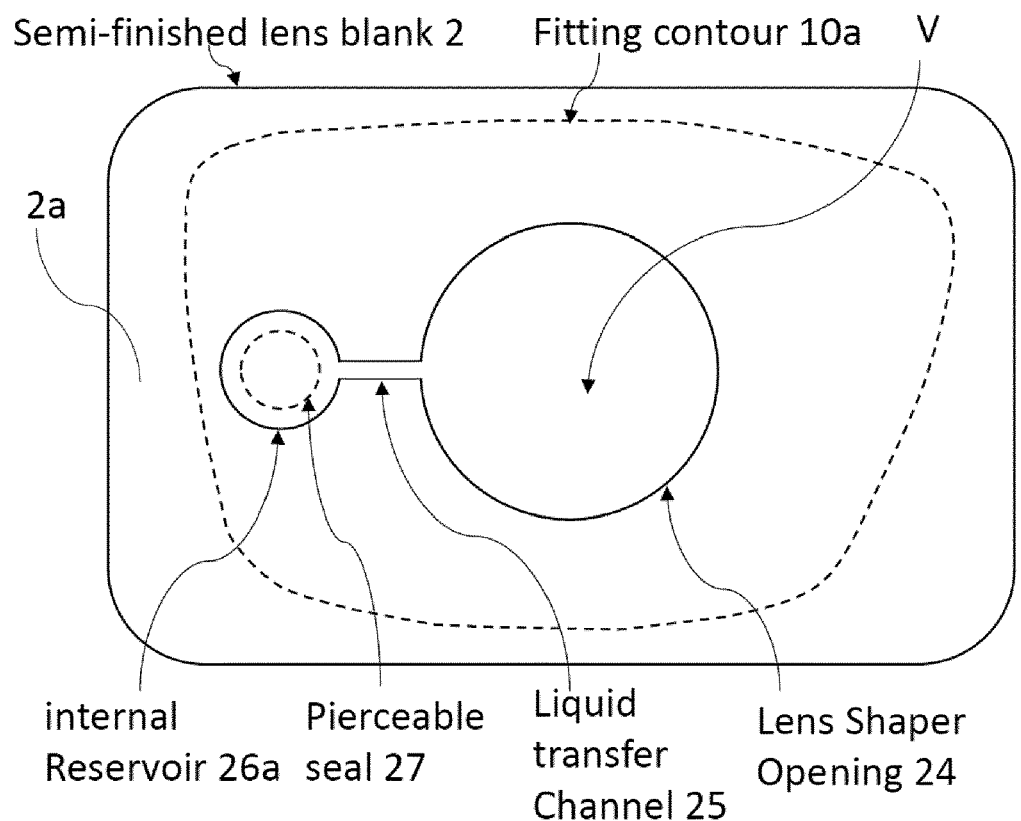

FIG. 5 shows the cross-section of a tunable lens based on an immersed lens shaper. A small reservoir is sealed with a pierceable seal and connected with the fluid cavity. A liquid-filled volume is formed between membrane, circular lens shaper and a spacer. The shape of the membrane is being tuned by pumping liquid from a syringe type actuator into the fluid cavity via the reservoir. The sealed structure comes in the form of semi-finished lens blank.

Figure 6:
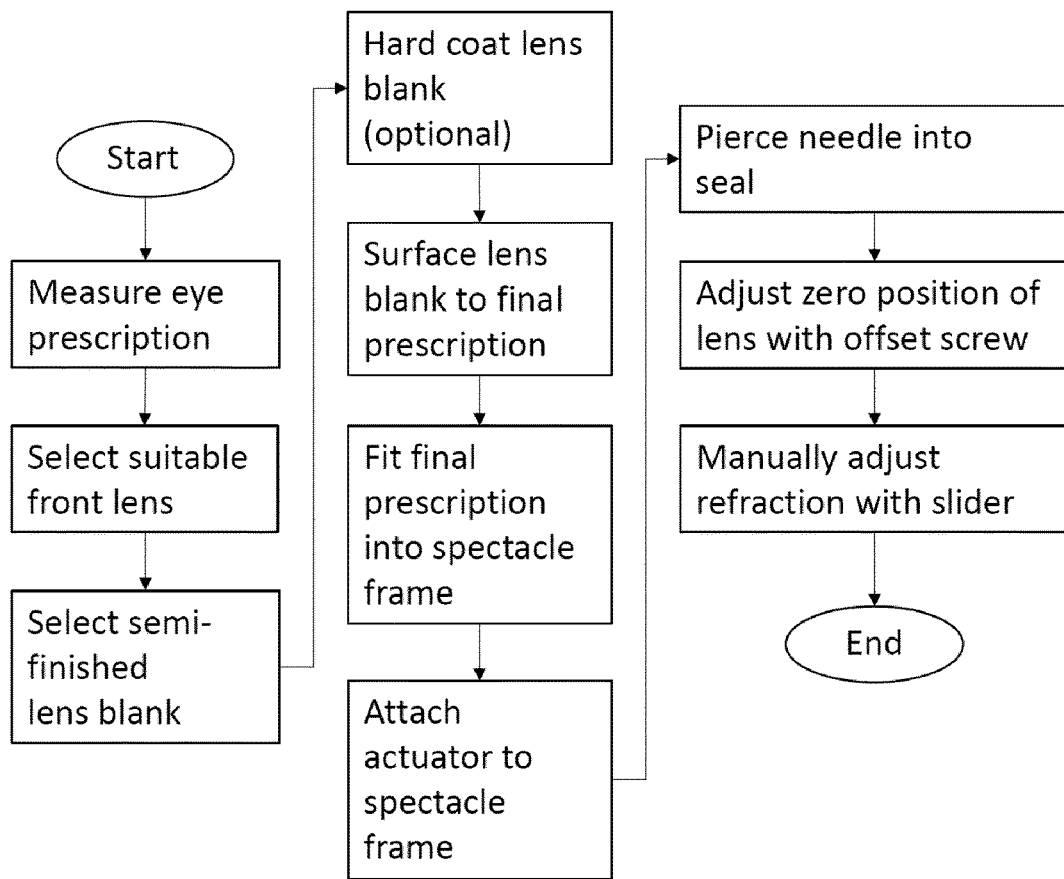

FIG. 6 is a flowchart showing a method of dispensing a tunable spectacle lens into a spectacle frame. There are several types of semi-finished lens blanks with different aperture sizes and blank size available in order to be compatible with a wide selection of frame geometries.

Figure 7:
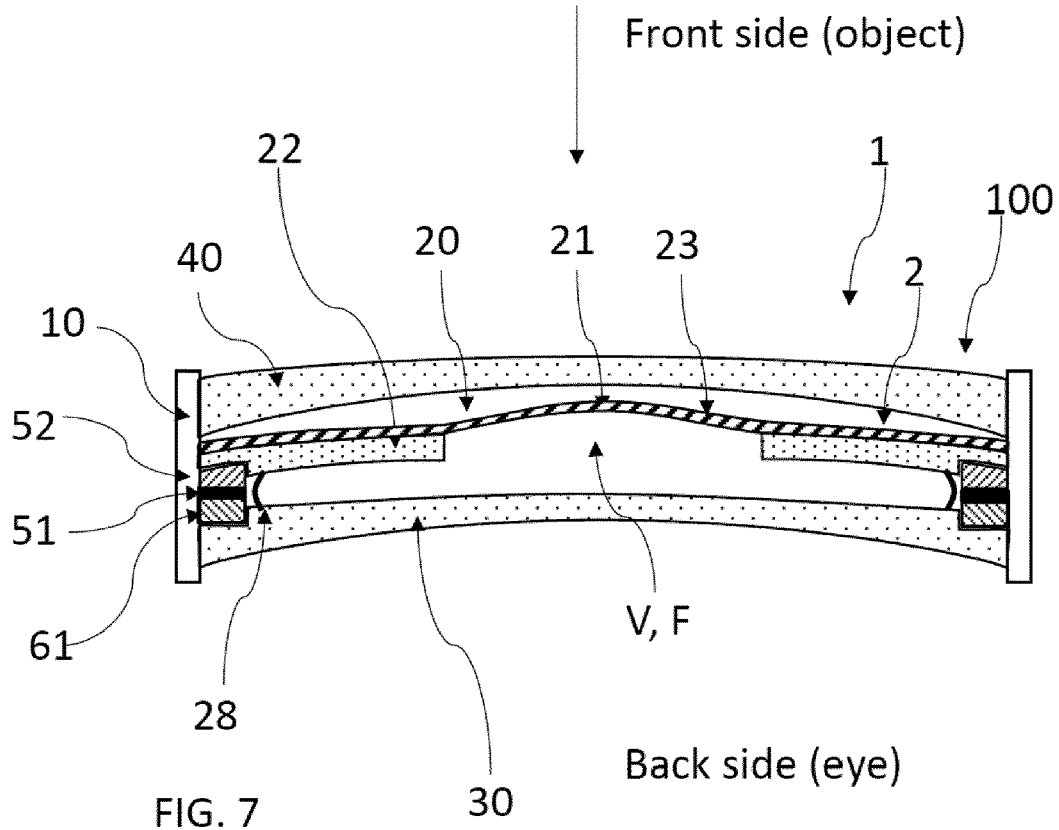

FIG. 7 shows the cross-section of a tunable lens based on an immersed lens shaper. A liquid-filled lens core is formed between membrane, circular lens shaper and a spacer. The liquid volume of the cavity and thus the curvature of the membrane can be adjusted by several piezo actuators that act as variable spacers.

Figure 8:
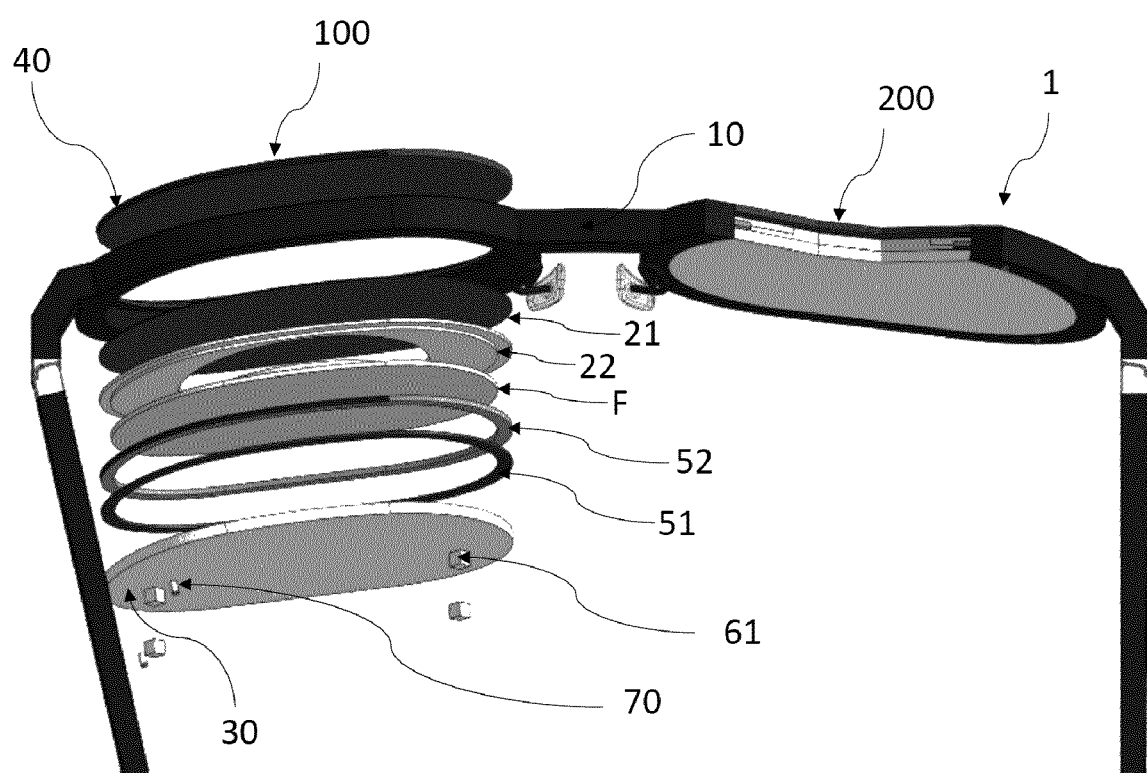

FIG. 8 shows an explosion view of the piezo-actuated device described in FIG. 7.

Figure 9:
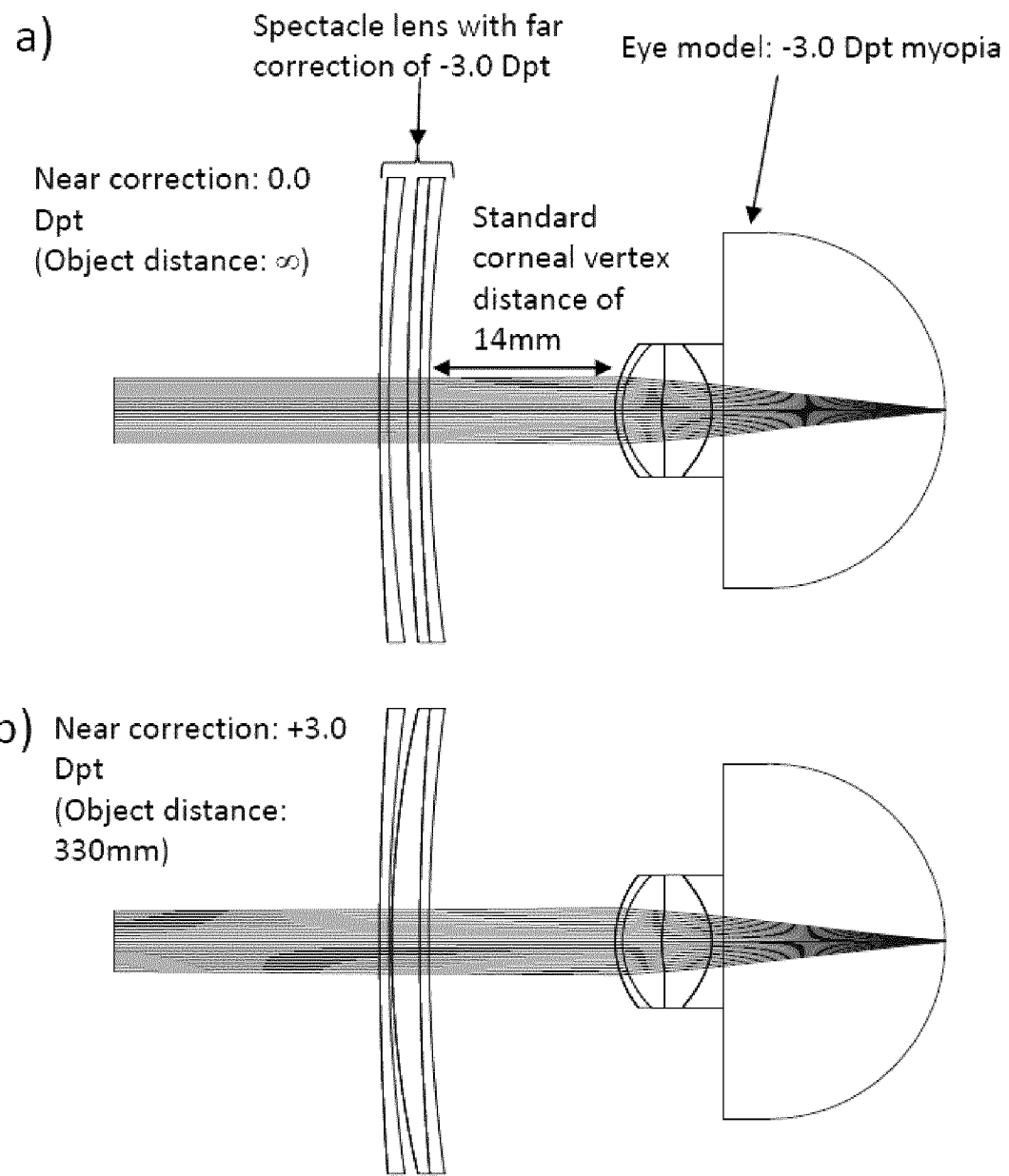
Figure 9:
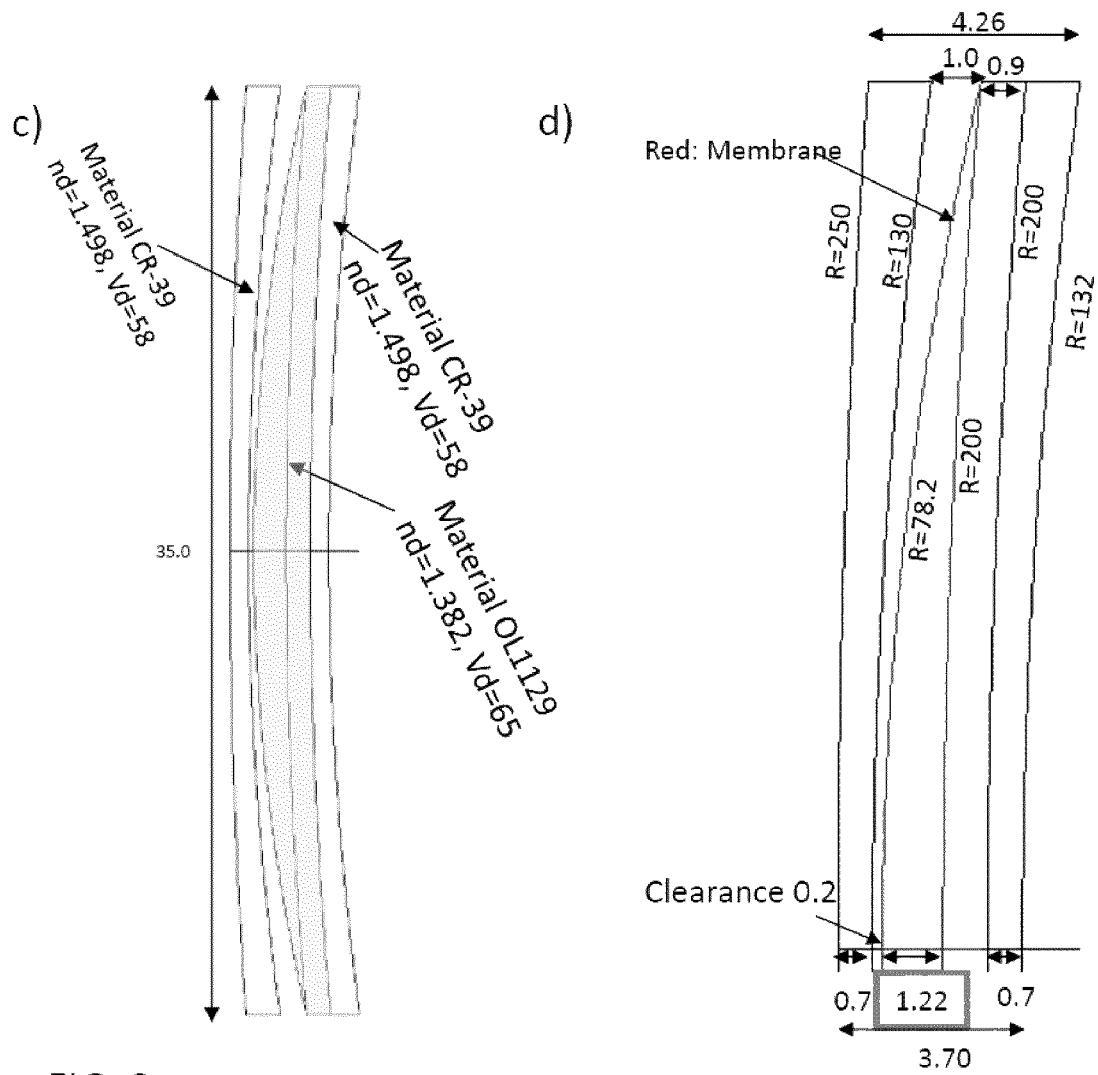

FIG. 9 shows a ZEMAX simulation using an eye model with −3.0 Dpt myopia. The membrane has a slight positive curvature when no actuation force is present. The front lens and the back container glass both feature negative refractive power to accommodate the initial correction of −3.0 Dpt and to compensate for the initial positive offset.

Figure 10:
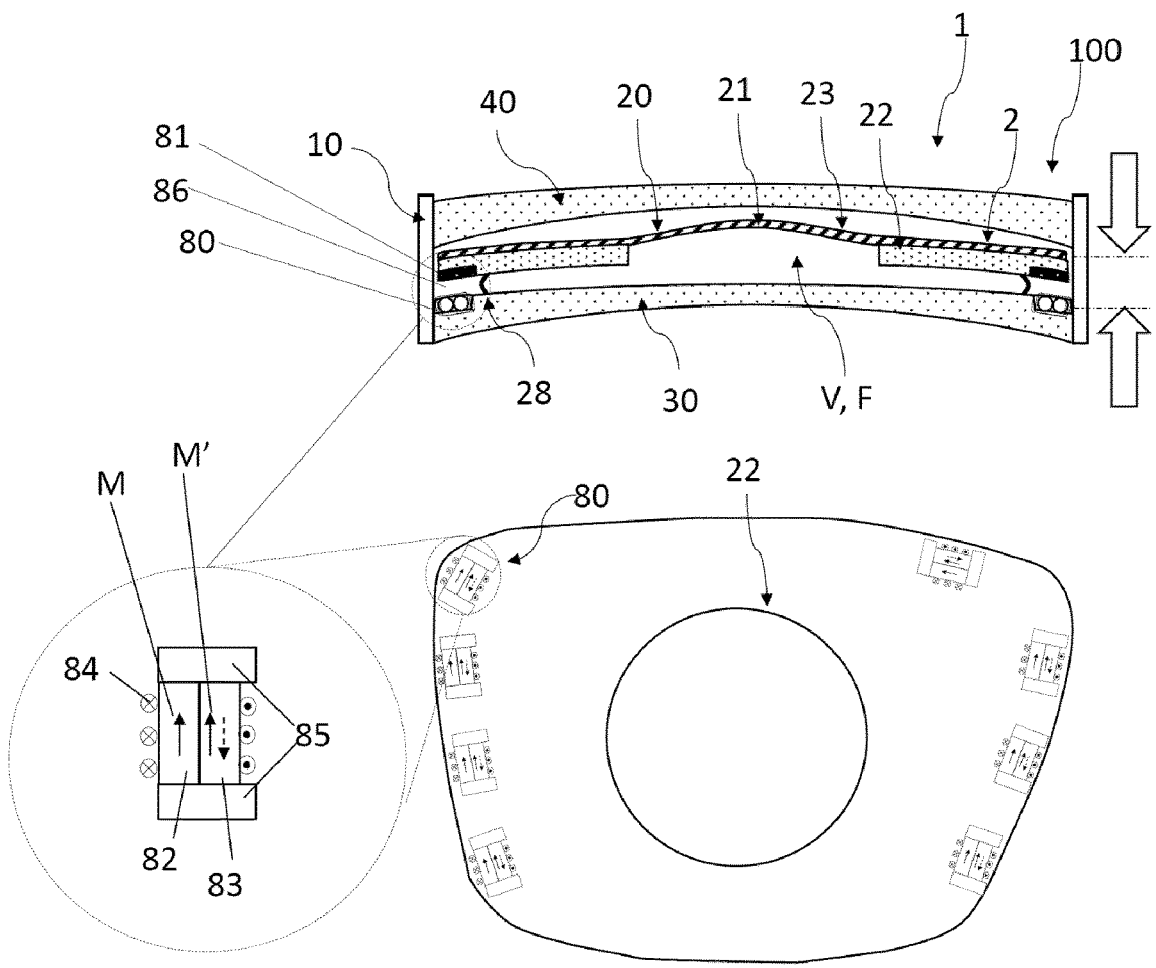

FIG. 10 shows a cross-section of a tunable lens based on an immersed lens shaper. A liquid filled lens core/volume is formed between a membrane, a circular lens shaper, and a back wall. The liquid-filled volume and thus the curvature of the membrane can be adjusted by several electropermanent magnets integrated into the back wall and arranged along a boundary area of the back wall. Counter members made from soft magnetic material are integrated into the moving lens shaper.

Figure 10A:
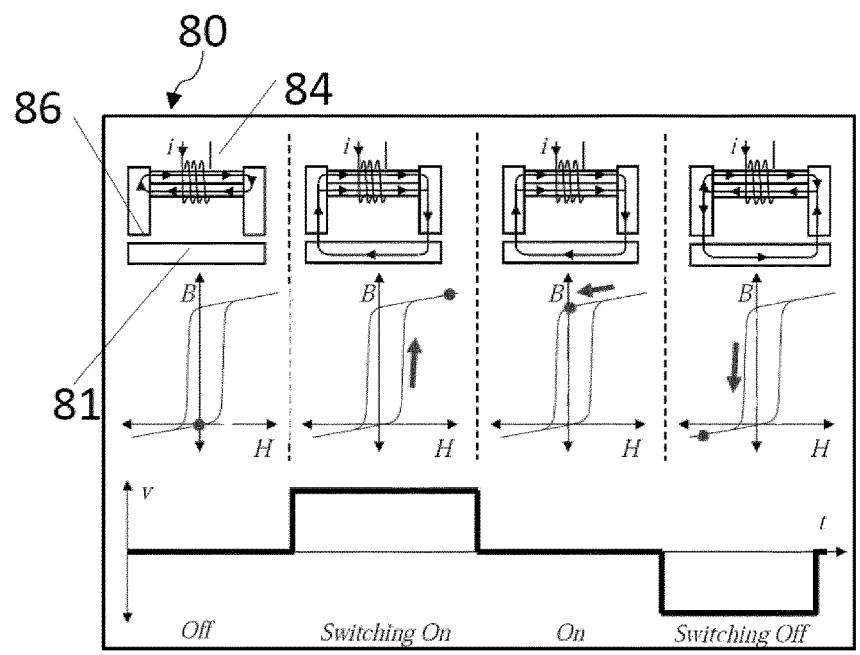

FIG. 10A shows the principle of an electropermanent magnet.

Figure 11:
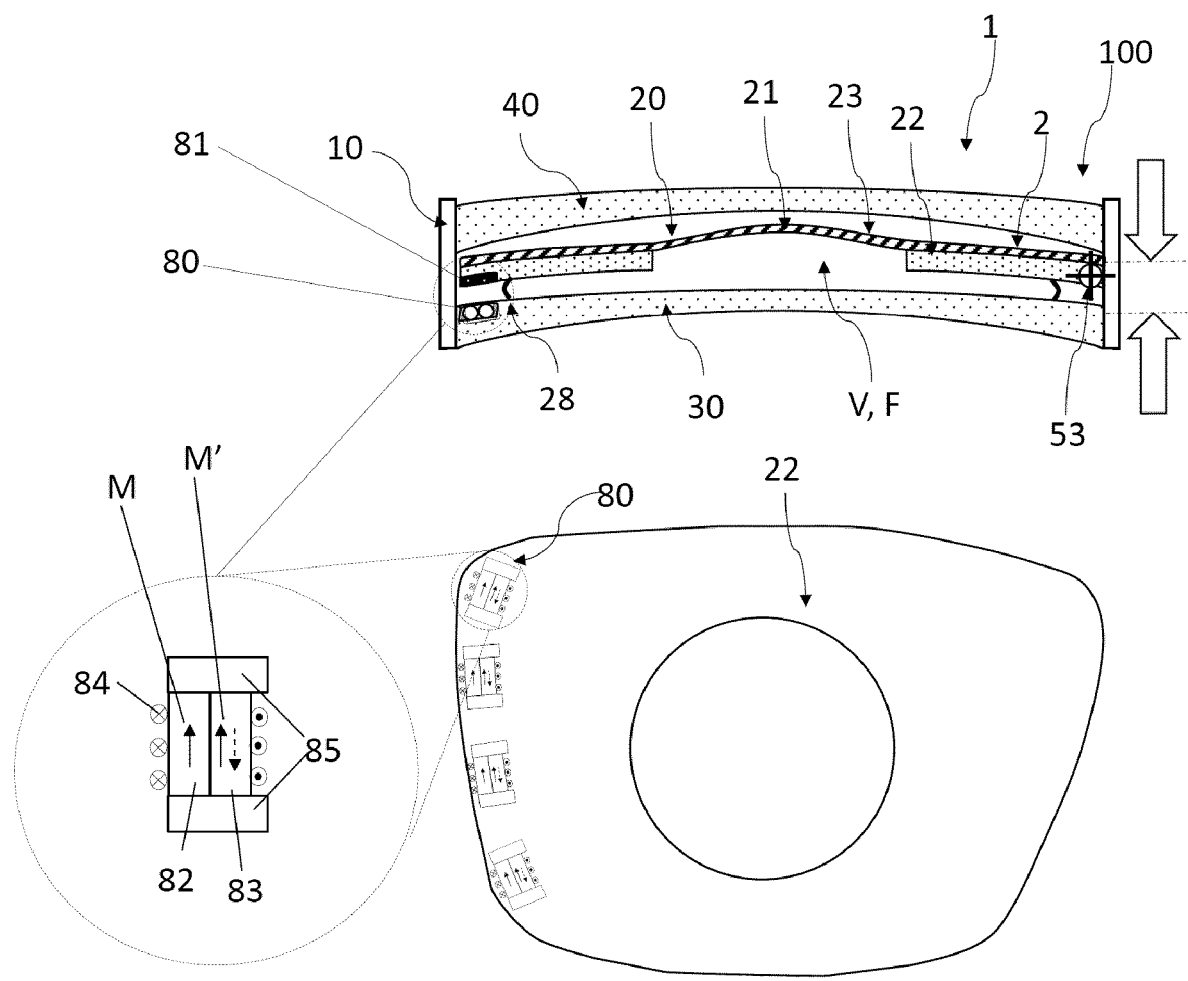

FIG. 11 shows a cross-section of a tunable lens based on an immersed lens shaper. A liquid filled volume is formed between a membrane, a circular lens shaper, and a back wall. The liquid-filled volume and thus the curvature of the membrane can be adjusted by several electropermanent magnet motors integrated into the back wall and arranged along a boundary area of the back wall on a side of the back wall opposite a mechanical hinge. Counter members formed out of soft magnetic material are integrated into the moving lens shaper.

Figure 12:
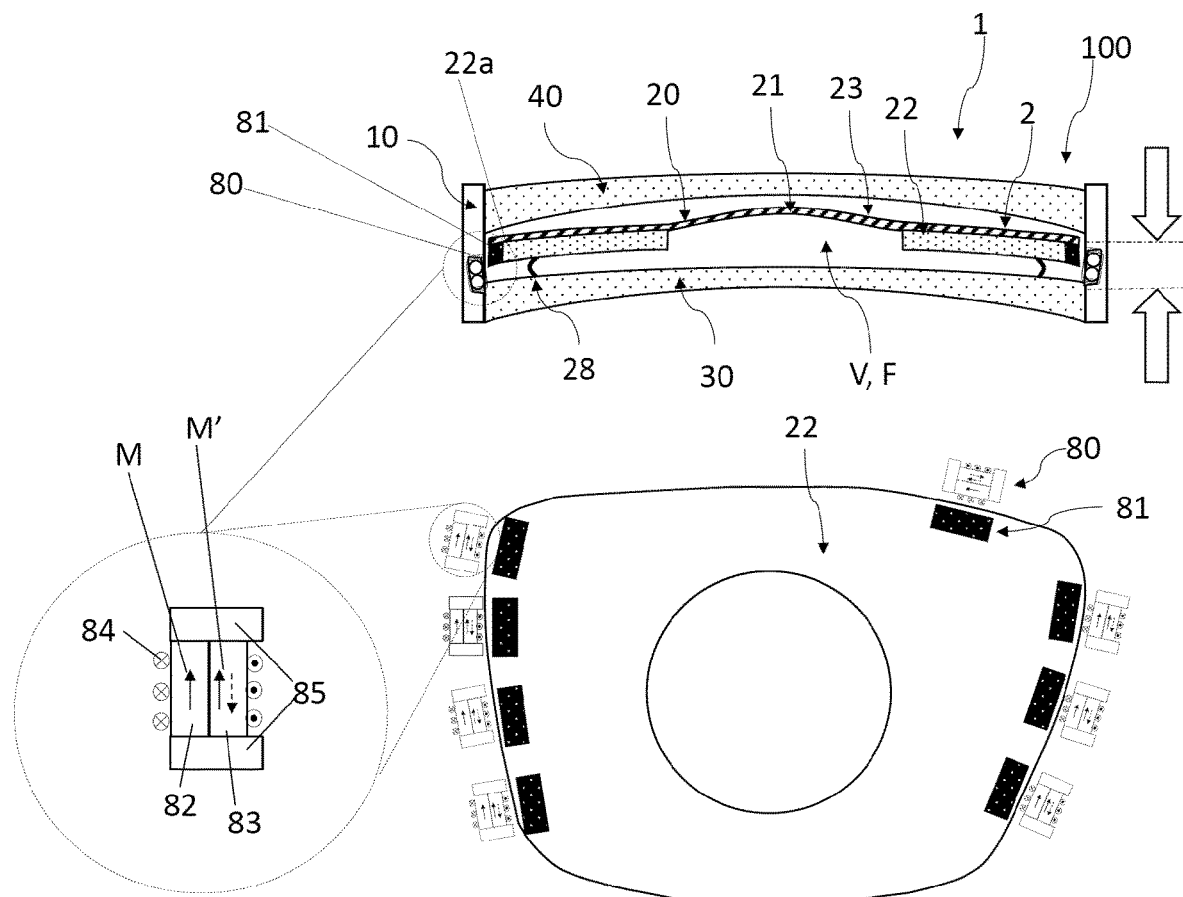

FIG. 12 shows a cross-section of a tunable lens based on an immersed lens shaper. A liquid filled volume is formed between membrane, circular lens shaper, and a back wall. The liquid filled volume and thus the curvature of the membrane can be adjusted by several electropermanent magnet motors integrated into the spectacles frame and arranged along the frame. Counter members formed out of soft magnetic material are integrated into the moving lens shaper.

Figure 13:
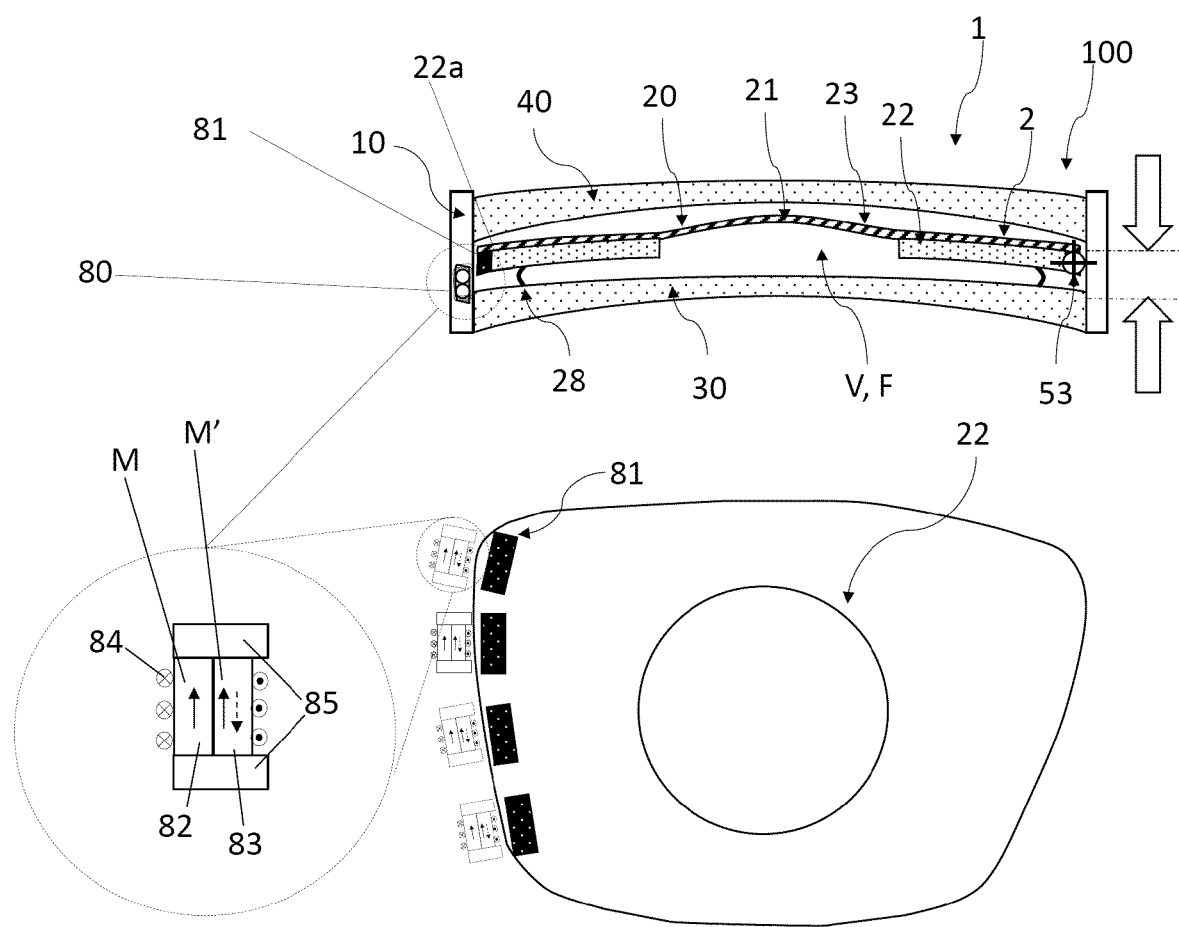

FIG. 13 shows a cross-section of a tunable lens based on an immersed lens shaper. A liquid filled volume is formed between membrane, circular lens shaper, and a back wall. The liquid filled volume and thus the curvature of the membrane can be adjusted by several electropermanent magnet motors integrated into the spectacles frame and arranged along the frame on a side of the frame opposite a mechanical hinge. Counter members made from soft magnetic material are integrated into the moving lens shaper.

Figure 14:
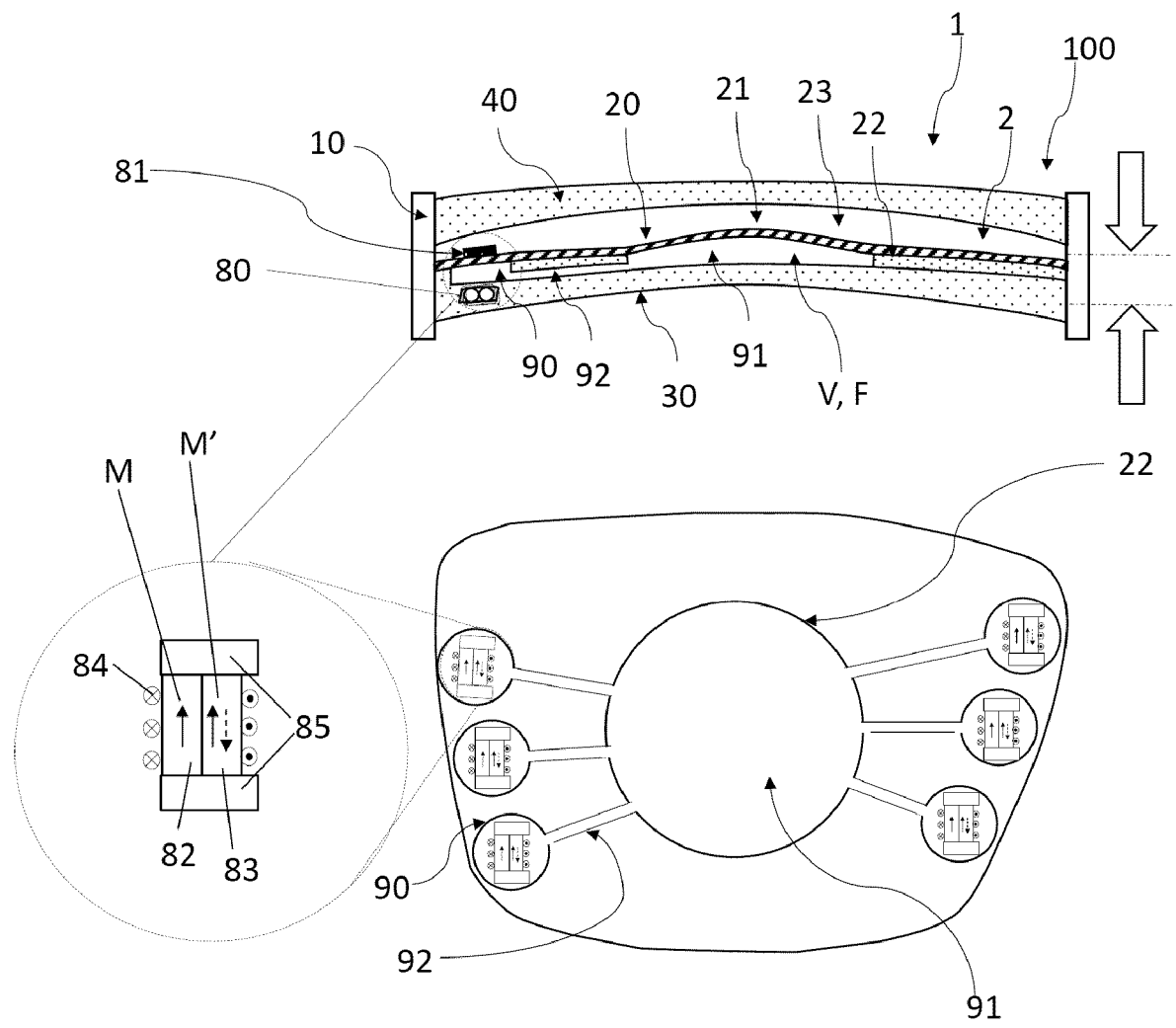

FIG. 14 shows a cross-section of a tunable lens based on a liquid filled volume that is connected through (e.g. microfluidic) channels to a series of smaller cavities. The liquid filled cavities as well as the actual lens area are arranged between membrane, lens shaper and back wall. The channels are indented either into the back wall and/or the lens shaper. Below every cavity an electropermanent magnet motor is placed. The counter members made from soft magnetic material are placed onto the membrane above each cavity.

While specific configurations and arrangements are discussed, it should be understood that this is done for illustrative purposes only. A person skilled in the pertinent art will recognize that other configurations and arrangements can be used without departing from the spirit and scope of the present invention. It will be apparent to a person skilled in the pertinent art that this invention can also be employed in a variety of other applications, for example and not limited to virtual reality (VR) devices, augmented reality (AR) devices, viewfinders.

It is noted that references in the specification to "one embodiment," "an embodiment, an example embodiment, "etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure or characteristic is described in connection with an embodiment, it would be within the knowledge of one skilled in the art to effect such feature, structure or characteristic in connection with other embodiments whether or not explicitly described.

Any embodiment involving an actuator has implicitly the possibility to adjust the left and the right eye simultaneously, once the base correction for each eye has been set.

FIG. 1 shows an example of an optical device 1 according to the invention in form of a pair of spectacles 1 with arbitrary shaped non-round frame openings O. The typical central viewing zone C covers only a fraction of the total frame opening O. Its exact position depends on the pupillary distance (PD). The central viewing zone C defines the quality of vision in the macular and near peripheral zone, whereas the peripheral viewing zone P only influences the mid-peripheral and far-peripheral vision. Only the central viewing zone C needs to be tunable. In a preferred embodiment the shape of the lens shaper opening 24 is elliptical. In a more preferred embodiment the shape of the lens shaper 22 is round (i.e. the opening 24 is circular). Particularly, a tunable liquid lens 2 with constant membrane thickness and a circular lens shaper opening yields a lens with the desired spherical properties.

FIG. 2 shows a fluid-filled lens container 2 of a first lens 100 of the optical device 1 according to an embodiment of the present invention. It consists of a transparent mostly rigid lens shaper 22 that follows on the outside the contour of the frame 10. At the position of the central viewing area C the lens shaper 22 has a circular opening 24. In a particular embodiment a flexible, elastic membrane 21 of high optical transparency is bonded onto the upper side of the lens shaper 22 (object side). The membrane 21 is bonded either glue-free or with highly transparent colorless glue. In addition the membrane 21 is fixed close to the frame 10 with a glue for improved mechanical stability. In a different embodiment the membrane 21 is bonded to the lower side (eye side) of the lens shaper 22. The lens shaper 22 is glued to the transparent back wall 30 that forms a lens (back lens) with a spacer ring 50. The back lens 30 and the lens shaper 22 may comprise circumferential recesses for receiving a section of the spacer ring 50, respectively.

The membrane 21, lens shaper 22, spacer ring 50 and back lens/back wall 30 form a cavity or volume V that is filled with fluid F. Preferably, The refractive index of the fluid F, membrane 21 and the lens shaper 22 are chosen to be index matched. In a specific embodiment the difference in index of refraction is smaller than 0.1. In a more specific embodiment the difference is index of refraction is smaller than 0.02. The fluid lens assembly 2 is placed behind the front lens 40 of the spectacles 1. Front lens 40, lens shaper 22 and back lens 30 are typically injection molded. Both front lens 40 and back lens 30 can include a spherical offset for myopia and hyperopia correction as well as provide correction of higher order aberrations such as astigmatism and gravity coma. In FIG. 2 for simplicity no actuation is shown. Various actuation mechanisms are depicted in the subsequent figures. Particularly, the spacer ring 50 (fitted into said recesses of the lens shaper 22 and the back lens 30) is glued tightly on the top surface and the bottom surface. The dimensions of the recesses and the spacer ring 50 as well as the thermal expansion coefficient of the material are matched in such a way that the temperature sensitivity of the lens 2 is minimized. The volume change resulting from the linear expansion of the spacer ring 50 preferably exactly compensates the volume change due to thermal expansion of the fluid F. The resulting thermal drift can be reduced down to zero for a small part of the full tuning range.

FIG. 3 includes in addition to FIG. 2 an actuation concept. The spacer ring 50 between lens shaper 22 and back lens 30 is compressible. By applying a force on one side and homogenously on the contour of the back lens 30, the compressible spacer ring 50 is selectively and homogenously compressed, respectively. In case of a selective force the other side of the spacer ring 50 acts as a mechanical hinge 53. In the latter the optical prism effect introduced by the hinge mechanism can be neglected, since due to the geometry only a small compression of the spacer ring 50 is required to deflect the membrane 21, namely said curvature-adjustable area 23. By compressing the compressible spacer ring 50 the liquid volume V between back lens 30 and lens shaper 22 as well as between back lens 30 and membrane 21 (area 23) is reduced and in consequence the membrane bulges out. The actuation can for example be provided by a squiggle motor that is integrated into either the spectacle frame 10 or the spectacle bracket. The ratio between central viewing zones to total spectacle surface provides a mechanical leverage. Only small displacements of the actuator are necessary to provide the required deflection of the membrane 21. Therefore, the optical prism effect induced by the non-symmetric actuation can be neglected.

FIG. 4 shows a configuration where the fluid volume inside the cavity V stays constant but fluid F enters from a reservoir 26 that is for example integrated into the frame 10. The reservoir 26 is connected to the fluid cavity (volume) V by means of a liquid transfer tube 25. This tube 25 can take the form of an actual tube or be monolithically integrated into the frame 10.

FIG. 5 shows an embodiment that is compatible with the generic workflow that can be adapted to a variety of different sizes and shapes of frames. The starting point is a semi-finished lens blank 2 that is slightly larger than the actual frame opening corresponding to dashed desired contour 10a. It contains a basic structure similar to the structure described in FIG. 4. Here the reservoir 26a can be monolithically integrated and contains a self-closing pierceable seal 27 through which liquid F can be inserted into the reservoir 26a located towards the edge of the viewing area. In a specific embodiment this seal 27 could be made from silicone or another elastomer. The semi-finished lens blank 2 can be dispensed into a spectacle frame 10 by standard fabrication methods. An optional protection film protects the membrane 21 from particles. Apart from the area of the reservoir 26a, the liquid transfer channel 25 and the fluid cavity V, the lens shaper 22 and the back lens 30 are sealed over the whole area. It is assured that the fluid cavity V remains sealed even after cutting along the fitting contour 10a. The key advantage of this configuration is that it can be fitted with conventional tools in the optometrist office. The drawing also includes a schematic representation of a compressible external liquid reservoir 26. It contains an offset screw to adjust the baseline curvature of the lens 2 (i.e. of the area 23). In a particular embodiment the reservoir 26 can be actuated with a slider mechanism. In a different embodiment the same reservoir 26 is actuated with a screw-type mechanism. The external reservoir 26 has at its end a conduit 62, particularly in the form of a needle 62, that allows it to penetrate the pierceable seal 27 and establish a liquid connection between integrated and external liquid reservoir. The person skilled in the art will understand that there are many different ways to implement such a liquid reservoir 26 and to connect the external liquid reservoir 26 to the integrated reservoir 26a.

FIG. 6 explains in detail the workflow for fitting a tunable spectacle lens 2 to a specific frame. It starts with measuring the eye prescription. Based on the prescription a suitable front lens 40 is selected. In a next step, according to the specific frame 10 the most suitable semi-finished lens blank 2 is chosen. The criteria is to have just enough sealing width around the integrated reservoir 26a and the fluid cavity (volume) V as necessary. The lens blank 2 is then optionally hard coated. In a next step the lens blank 2 is surfaced to the final prescription (for example ensuring the right pupillary distance). Then the final prescription is fitted into the spectacle frame 10. In some cases where the external liquid reservoir 26 is not integrated the reservoir 26/actuator 60 is attached to the spectacle frame 10. The needle 62 of the external reservoir 62 is pierced into the seal. The zero position is then adjusted by turning the offset screw 64. The refractive power can be switched by actuating a slider on the spectacle frame.

FIG. 7 includes in addition to FIG. 2 a piezo actuation concept. Several piezo actuator tubes 61 are placed along the outer edge of the lens 2. Applying a tension to contracting piezo actuator 61 reduces the distance between lens-shaper 22 and back lens 30 and thus the volume of the fluid cavity V and as a matter of fact the curvature of the membrane 21 (here the curvature of said area 23 defined by the lens shaper opening 24). The piezo actuator tubes 61 transfer their forces onto a non-compressible spacer ring 51. In a particular embodiment this spacer ring 51 is stamped from a metal sheet. The non-compressible spacer ring 51 itself is connected to a compressible spacer ring 52 which connects to the lens shaper 22. The function of the compressible spacer ring 52 is to compensate thermal effects within the lens 2. This increases the focal length stability of the lens 2 to external temperature variations.

In order to provide a fluid-tight cavity an additional sealing membrane connects the lens shaper with the back lens container. In a preferred embodiment the compressible spacer ring is made from silicone. The piezo-actuation concept allows for fast diopter variations. A typical tuning speed would be in the order of 10-100 ms. Fast tuning is required in case the eyewear has built in sensors that monitor the eye gaze distance with optical/electrical means.

FIG. 8 shows a more detailed embodiment of the previously shown assembly in in FIG. 7 with piezo actuators 61. In addition it also shows the eye gaze tracking sensors 70 that may be used to track eye movements (particularly for controlling the actuators 61).

FIG. 9a shows an eye model with a refractive power of −3.0 Dpt, a common value for myopia. The near correction of the tunable lens is set to zero. An object placed at infinity creates a sharp image on the retina. FIG. 9b shows the situation where the object distance is 330 mm. In this case the near correction of the tunable lens needs to be set to +3 Dpt. The negative initial lens power can be achieved by attributing a negative lens power to the front lens or to the back lens container or to a combination of both. For the ZEMAX simulations CR-39, a transparent plastic material with refractive index 1.498 and Abbe number 58 has been assumed. For the lens fluid a liquid with refractive index 1.38 and an Abbe number of 65 has been assumed. FIG. 9d) shows the membrane in zero actuation (radius of curvature 200 mm) and in full actuation (radius of curvature 78 mm). In this example a rather large tunable clear aperture (CA) of 35 mm has been assumed. This results in a total lens thickness of 4.26 mm at the edge and 3.7 mm in the center. If the CA is reduced to about 25 mm, the lens can be much thinner.

In all different actuation mechanism there is the option to adjust the left and the right eye simultaneously, once the base correction for each eye has been set. In case of electrically actuated lenses this can easily implemented in an electronics circuit. In case of mechanically tuned lenses the simultaneous tuning can be also implemented by a person skilled in the art.

The embodiment shown in FIG. 10 includes in addition to FIG. 2 an actuation concept based on several electropermanent magnets 80. Such an actuator is a type of a permanent magnet in which the external magnetic field can be switched on or off by a pulse of an electric current in coil (e.g. a wire winding) 84 as indicated in FIG. 10A.

The electropermanent magnet 80 consists of two sections or magnets 82, 83, namely a first magnet 82 (of a "hard"/ high coercivity magnetic material) and a second magnet 83 (of a "soft"/low coercivity magnetic material). The direction of the magnetization M' of the latter piece 83 can be switched by a pulse of an electrical current in coil 84 surrounding the second magnet 83. When the magnetically soft and hard materials 82, 83 have opposing magnetizations M, M' the electropermanent magnet 80 produces no net external field across its poles, while when their direction of magnetization M, M' is aligned, the electropermanent magnet 80 produces an external magnetic field. Two pole members 85 consisting of soft magnetic material are located on both ends of the two permanent magnets 82, 83. Because the pole members 85 have a higher permeability than the air, they will concentrate the magnetic flux of the permanent magnets 82, 83. This electropermanent magnet 80 is mechanically connected to the back wall or back lens 30.

When the electropermanent magnet 80 is switched on and a counter member 81 of a soft magnetic material is placed in close proximity to the electropermanent magnet, the magnetic flux will flow confined in the soft magnetic material creating an attractive force. With the counter member 81 mechanically connected to the lens shaper 22, this attractive force reduces the distance between lens shaper 22 and back wall 30 and thus a portion of the volume V in which the fluid (or liquid) F resides. Due to this the stretchable curvature-adjustable area of the membrane 21 bulges further out so that the curvature of the curvature-adjustable area 23 of the membrane 21 increases (here the curvature of said area 23 defined by the lens shaper opening 24). Of course, the position of the electropermanent magnet 80 and the counter member 81 can be interchanged (i.e. the two components 80, 81 can switch places).

Particularly, as shown in FIG. 10, a plurality of electropermanent magnets 80 is arranged along a circumferential boundary area of the back wall 30. Particularly, the electropermanent magnets are recessed into the back wall, wherein each electropermanent magnet 80 faces an associated counter member 81 that is particularly recessed into the lens shaper 22. Particularly, each pole member 85 of the respective electropermanent magnet 80 comprises a face side 85a that faces the associated counter member 81 and forms a gap 86 with the associated counter member 81. When the respective electropermanent magnet 80 generates an external magnetic field, the respective counter member 81, and therefore the lens shaper 22, is pulled towards the back wall 30. This relative movement allows to adjust the curvature of the curvature-adjustable area 23 of the membrane 21 since fluid is displaced towards the curvature-adjustable area 23 which then bulges outwards accordingly. When the respective external magnetic field is turned off, the curvature-adjustable area 23 of the membrane 22 returns to its initial position pressing fluid back into the region between the lens shaper 22 and the back wall 30.

Further, in order to provide a fluid-tight volume V, an additional circumferential and flexible sealing member (e.g. a sealing membrane or a deformable sealing ring) 28 is provided which connects the lens shaper 22 to the back wall 30. The electropermanent magnets 80 and counter members 81 are arranged outside the sealed volume V.

The electropermanent magnet concept allows for fast diopter variations. A typical tuning speed can be in the order of 1 ms. Fast tuning is required in case the eyewear has built-in sensors that monitor the eye gaze distance with optical/electrical means.

The embodiment depicted in FIG. 11 includes in addition to FIG. 10 a mechanical hinge 53 on one side lens shaper 22, which hinge 53 connects an edge region of the lens shaper 22 to a frame 10 that holds the container 2. Here, the at least one electropermanent magnet 80 or a plurality of electropermanent magnets 80 are arranged on a side of the lens shaper 22/back wall 30 opposite the hinge 53. When the electropermanent magnets 80 are switched on, the attractive force between the respective electropermanent magnet 80 arranged on the back wall 30 and the respective counter member 81 facing its associated electropermanent magnet 80 reduces the distance between the lens shaper 22 and the back wall 30 due to pivoting the lens shaper 22 towards the back wall 30. Thus, again, a portion of the volume V is compressed and fluid (e.g. liquid) F is pressed against the curvature-adjustable area 23 of the membrane 21 which then bulges outwards which increases the curvature of the said curvature-adjustable area 23 of the membrane 21.

Further, in order to reduce the tendency of the actuator assembly used in the embodiments of FIGS. 10 and 11 to snap in (i.e. contact of counter member 81 and associated electropermanent magnet 80), which makes it more difficult to control the resulting force accurately, the embodiment shown in FIG. 12 uses a different arrangement of the electropermanent magnets 80 and associated counter members 81. Here, the electropermanent magnets 80 are integrated into the frame 10 of the spectacles and are arranged around the periphery of the lens/container 2, while the counter members 81 are integrated into the moving lens shaper 22.

In the non-actuated position, the electropermanent magnets 80 and their counter members 81 are shifted with respect to each other. When the respective electropermanent magnet 80 is actuated by switching the magnetization M' of the second magnet 83 to be parallel to the magnetization M of the first magnet 82 (here by means of a suitable electrical current pulse applied to the respective coil 84), the respective external magnetic field pulls the respective counter member 80 in front of the respective electropermanent magnet 80 in order to maximize the magnetic flux. This configuration is not affected by magnetic 'snap-in', since the counter members are pulled alongside the electropermanent magnets 80 but not directly towards them.

Also here, the position of the respective electropermanent magnet 80 can be interchanged with the position of the associated counter member 81.

Furthermore, the embodiment depicted in FIG. 13 includes in addition to FIG. 12 a mechanical hinge 53 as explained above in conjunction with FIG. 11. Also here, the electropermanent magnets 80 are arranged on the opposite side of the hinge 53. When the electropermanent magnets 80 are switched on, the attractive force between the respective electropermanent magnet 80 and the associated counter member 81 reduces the distance between the lens shaper 22 and back wall 30 and thus compresses a portion of the volume V so that the fluid F is pressed against the curvature-adjustable area 23 of the membrane 21. Consequently, the curvature of said area 23 is increased as already described above.

In all configurations depicted in FIGS. 10 to 13 the respective electropermanent magnet 80 can be addressed individually and it is possible to only switch a defined number of the electropermanent magnets 80. Having N identical electropermanent magnets 80 and associated counter members 81, N different states/curvatures of the area 23 and thus N different focal powers of the lens/container 2 can be achieved.

Further, according to yet another embodiment N electropermanent magnets 80 of different strengths may be used which allows one to realize a total of 2 to the power of N different states/focal powers.

Furthermore, by adjusting the parameters of the current pulses applied to the respective coil 84, the respective electropermanent magnet 80 can either be fully or only partially polarized. This allows one to adjust the force of each electropermanent magnet 80 in an analogue fashion. Thus, different amounts of attractive forces and therefore curvatures of said area 23 can generated and one can quickly switch between them.

Furthermore, it is possible to apply full or partial polarization to electropermanent magnets of different strengths to further increase variability of the focal power of the lens/container 2.

Further, the embodiment shown in FIG. 14 uses one or several reservoirs 90 which are connected via (e.g., microfluidic) channels 92 with a main cavity 91 of the volume V. The reservoirs 90 as well as the actual lens cavity 91 are formed between the membrane 21, the lens shaper 22, and the back wall 30. The lens shaper 22 may consist of a transparent material with a recess for the main cavity (central lens area) 91 and further recesses for the smaller reservoirs 90. While the main cavity 91 is preferably circular or round in order to reduce optical aberrations, the smaller reservoirs 90 can also have non-round shapes. The reservoirs 90 may also be arranged close to the edge of the lens shaper so that they are positioned in a slot of the frame that holds the edge of the lens shaper 22. Thus, the reservoirs 90 are not visible from the outside The microfluidic channels are formed e.g. either into the back wall 30 and/or into the lens shaper 22. This can be done by processes such as micro-milling, embossing or molding.

The fluid/liquid F and the lens shaper 22 and the back wall material are preferably index-matched so that the microfluidic channels 92 as well as the central cavity 91 are ideally non-visible. Below every small reservoir 90 an electropermanent magnet 80 is placed. The associated counter member 81 is placed onto the membrane 21 above the respective reservoir 90. Thus, the reservoirs 90 act as fluid or liquid pumps. The attractive force on the respective counter member 81 presses the upper wall section 93 of the respective reservoir down (the respective wall section 93 is formed by the membrane 21), and consequently reduces the effective volume inside the respective reservoir 90. The displaced fluid/liquid F flows into the main cavity 91 and creates an over-pressure which curves said area 23 of the membrane 21 outwards as already explained above. The fluid volume of the main cavity 91 and thus the curvature of the area 23 of the membrane 21 can be adjusted by controlling the effective volumes of the individual reservoirs 90. The actuator 80 can be designed in such a way that it snaps-in. As a consequence, the displaced fluid/liquid F is exactly known and given by the geometry of the small reservoirs 90. Using N identical reservoirs 90, N different states of focal power of the lens/container 2 can be achieved. Another embodiment would use N small reservoirs 90 of different sizes. In this case a total number of 2 to the power of N different states (focal powers) can be addressed.

The invention claimed is:

1. An optical device, comprising: at least a first lens having an adjustable focal length, wherein the first lens comprises a container that defines a volume which is filled with a transparent fluid, and wherein the container comprises a front wall, which front wall comprises a transparent membrane that is flexible and stretchable and a transparent lens shaper that is immersed in the fluid and connected to the membrane, so that the lens shaper defines a curvature-adjustable area of the membrane, and wherein the container comprises a back wall facing the front wall, wherein the fluid is arranged between the front wall and the back wall, and wherein the back wall forms a lens, the optical device comprises an actuator means which is configured to adjust said volume of the first lens in order to adjust the curvature of said curvature-adjustable area, wherein adjusting said volume comprises compressing a portion of the volume so that the liquid contained in the volume presses against the membrane and thereby adjusts the curvature of said curvature-adjustable area, and/or wherein adjusting said volume comprises expanding a portion of the volume so that the fluid presses less against the curvature-adjustable area of the membrane and thereby adjusts the curvature of said curvature-adjustable area, and the actuator means comprises at least one electropermanent magnet and at least one magnetic flux guiding counter member attractable by the electropermanent magnet for adjusting said volume of the first lens in order to adjust the curvature of said curvature-adjustable area of the membrane.

2. The optical device according to claim 1, characterized in that the lens shaper comprises a circular opening which is covered by the membrane, wherein said curvature-adjustable area covers said opening, particularly in a congruent fashion.

3. The optical device according to claim 1, characterized in that a material of the lens shaper, the membrane, and the fluid each comprise a refractive index, wherein the absolute value of the difference of any two refractive indices of these three refractive indices is smaller than 0.1, preferably smaller than 0.02.

4. The optical device according to claim 1, characterized in that the container forms a semi-finished lens-blank having a circumferential boundary region that is configured to be at least one of: formed, shaped, machined, cut, sanded, milled, in order to form an outer contour of the container that fits a desired frame, particularly a spectacle frame, for holding the container.

5. The optical device according claim 1, characterized in that the optical device comprises a front lens arranged in front of the membrane of the front wall for protecting the membrane and for providing a base refractive power.

6. The optical device according to claim 1, characterized in that the container comprises a spacer ring arranged between the lens shaper and the back wall, the spacer ring forms a sealing ring for the container, and the spacer ring is elastically compressible.

7. The optical device according to claim 1, characterized in that the actuator means is configured to pump fluid into and/or out of the volume to adjust said volume of the first lens.

8. The optical device according to claim 1, characterized in that the at least one electropermanent magnet is configured to generate an external magnetic field for attracting said at least one counter member for adjusting the curvature of said curvature-adjustable area.

9. The optical device according to claim 8, characterized in that the at least one electropermanent magnet comprises a first magnet having a first coercivity and a first magnetization, and wherein the electropermanent magnet further comprises a second magnet having a second coercivity and a second magnetization, wherein the first coercivity is larger than the second coercivity, and wherein the at least one electropermanent magnet further comprises a coil encompassing the second magnet such that by applying a corresponding current to the coil the second magnetization can be switched from a parallel state where the two magnetizations are parallel to an antiparallel state where the two magnetizations are antiparallel and vice versa, wherein when the second magnetization is in the parallel state the electropermanent magnet generates said external magnetic field, and wherein when the second magnetization is in the antiparallel state said external magnetic field vanishes.

10. The optical device according to claim 8, characterized in that the at least one electropermanent magnet is arranged on the back wall and the at least one associated counter member is arranged on the lens shaper.

11. The optical device according to claim 8, characterized in that said container is held by a frame, wherein the at least one electropermanent magnet is arranged on the frame and the associated counter member is arranged on the lens shaper at an edge of the lens shaper.

12. The optical device according to claim 1, characterized in that the lens shaper is connected to the back wall via a hinge so that the lens shaper can be pivoted with respect to the back wall.

13. The optical device according to claim 12, characterized in that the hinge is arranged on a side of the lens shaper opposite the at least one electropermanent magnet.

14. The optical device according to claim 1, characterized in that the lens shaper is connected to the back wall via a circumferential flexible seal member.

15. The optical device according to claim 1, characterized in that the volume comprises at least one reservoir connected to a main cavity (91) of the volume by a channel, wherein the at least one reservoir is formed as a recess formed into the lens shaper and/or into the back wall, and the at least one reservoir is arranged between the at least one electropermanent magnet and the at least one associated counter member, so that when the electropermanent magnet attracts the associated counter member the at least one reservoir is compressed and fluid contained in the at least one reservoir is pushed into the main cavity and presses against the membrane and thereby adjusts the curvature of said curvature adjustable area of the membrane.

16. The optical device according to claim 1, characterized in that the optical device is formed as a pair of spectacles, particularly for virtual reality or augmented reality, or a headset, particularly for virtual reality or augmented reality, wherein the first and/or a second lens are held by a frame that can be worn by a user such that the respective lens is arranged in front of an associated eye of the user.

* * * * *